(12) United States Patent
Adkins et al.

(10) Patent No.: US 12,247,096 B2
(45) Date of Patent: Mar. 11, 2025

(54) PROCESSES AND PRODUCTION PLANTS FOR PRODUCING POLYMER POLYOLS

(71) Applicant: Covestro LLC, Pittsburgh, PA (US)

(72) Inventors: Rick Adkins, Canonsburg, PA (US); Jack Reese, Renfrew, PA (US)

(73) Assignee: Covestro LLC, Pittsburgh, PA (US)

( * ) Notice: Subject to any disclaimer, the term of this patent is extended or adjusted under 35 U.S.C. 154(b) by 0 days.

(21) Appl. No.: 18/594,661

(22) Filed: Mar. 4, 2024

(65) Prior Publication Data

US 2024/0199790 A1 Jun. 20, 2024

Related U.S. Application Data

(62) Division of application No. 17/673,325, filed on Feb. 16, 2022, now Pat. No. 11,952,454.

(60) Provisional application No. 63/256,654, filed on Oct. 18, 2021.

(51) Int. Cl.
| | |
|---|---|
| *C08G 65/26* | (2006.01) |
| *B01J 19/00* | (2006.01) |
| *B01J 19/06* | (2006.01) |
| *B01J 19/18* | (2006.01) |
| *C08G 18/04* | (2006.01) |
| *C08G 18/16* | (2006.01) |
| *C08G 18/48* | (2006.01) |
| *C08G 18/67* | (2006.01) |
| *C08G 18/81* | (2006.01) |

(52) U.S. Cl.
CPC ........ *C08G 18/485* (2013.01); *B01J 19/0066* (2013.01); *B01J 19/06* (2013.01); *B01J 19/1868* (2013.01); *C08G 18/04* (2013.01); *C08G 18/168* (2013.01); *C08G 18/678* (2013.01); *C08G 18/8108* (2013.01); *C08G 65/2606* (2013.01); *C08G 65/2609* (2013.01); *B01J 2219/00033* (2013.01)

(58) Field of Classification Search
CPC .................. C08G 65/2606; C08G 65/2609
See application file for complete search history.

(56) References Cited

U.S. PATENT DOCUMENTS

| | | |
|---|---|---|
| 3,404,109 A | 10/1968 | Milgrom |
| 3,427,256 A | 2/1969 | Milgrom |
| 3,427,334 A | 2/1969 | Belner |
| 3,427,335 A | 2/1969 | Herold |
| 3,829,505 A | 8/1974 | Johnston |
| 3,941,849 A | 3/1976 | Johnston |
| 3,953,393 A | 4/1976 | Ramlow et al. |
| 4,119,586 A | 10/1978 | Shah |
| 4,463,107 A | 7/1984 | Simroth et al. |

(Continued)

FOREIGN PATENT DOCUMENTS

| | | |
|---|---|---|
| CA | 2578826 A1 | 5/1997 |
| EP | 2894180 A1 | 7/2015 |

(Continued)

*Primary Examiner* — Michael L Leonard
(74) *Attorney, Agent, or Firm* — Donald R. Palladino

(57) ABSTRACT

Processes for preparing a polymer polyol (PMPO) in which a base polyol is continuously produced in a continuous base polyol reactor, the base polyol is continuously discharged from the continuous base polyol reactor; the base polyol is continuously introduced to a continuous PMPO reactor, which is different from the continuous base polyol reactor, and PMPO is continuously removed from the PMPO reactor. Production plant configured to carry out such processes are also described.

7 Claims, 4 Drawing Sheets

(56) References Cited

U.S. PATENT DOCUMENTS

| | | | |
|---|---|---|---|
| 4,472,560 A | 9/1984 | Kuyper et al. |
| 4,477,589 A | 10/1984 | Van Der Hulst et al. |
| 4,521,546 A | 6/1985 | O'Connor et al. |
| 5,158,922 A | 10/1992 | Hinney et al. |
| 5,196,476 A | 3/1993 | Simroth |
| 5,324,774 A | 6/1994 | Nishikawa et al. |
| 5,470,813 A | 11/1995 | Le-Khac |
| 5,482,908 A | 1/1996 | Le-Khac |
| 5,536,883 A | 7/1996 | Le-Khac |
| 5,545,601 A | 8/1996 | Le-Khac |
| 5,627,120 A | 5/1997 | Le-Khac |
| 5,689,012 A | 11/1997 | Pazos et al. |
| 5,777,177 A | 7/1998 | Pazos |
| 5,814,699 A | 9/1998 | Kratz et al. |
| 5,958,994 A | 9/1999 | Lear et al. |
| 5,990,232 A | 11/1999 | Shen et al. |
| 6,018,017 A | 1/2000 | Le-Khac |
| 6,455,603 B1 | 9/2002 | Fogg |
| 6,624,209 B2 | 9/2003 | Kawamoto et al. |
| 6,780,932 B2 | 8/2004 | Heyman et al. |
| 8,017,664 B2 | 9/2011 | Heinis et al. |
| 8,470,927 B2 | 6/2013 | Pazos et al. |
| 8,877,863 B2 | 11/2014 | Pazos et al. |
| 8,987,396 B2 | 3/2015 | Adkins et al. |
| 2005/0192369 A1 | 9/2005 | Pazos et al. |
| 2013/0331614 A1 | 12/2013 | Eleveld et al. |
| 2016/0333129 A1 | 11/2016 | Hofmann et al. |
| 2017/0306076 A1 | 10/2017 | Adkins et al. |
| 2020/0392291 A1 | 12/2020 | Suzuki et al. |

FOREIGN PATENT DOCUMENTS

| | | |
|---|---|---|
| JP | 6-228247 A | 8/1994 |
| JP | 4145123 B2 | 9/2008 |

PROCESSES AND PRODUCTION PLANTS FOR PRODUCING POLYMER POLYOLS

CROSS-REFERENCE TO RELATED APPLICATION

This application is a divisional of U.S. patent application Ser. No. 17/673,325, which claims priority to U.S. Provisional Application Ser. No. 63/256,654, filed Oct. 18, 2021, the entire contents of both of which being incorporated herein by reference.

FIELD

This disclosure relates to processes for preparing a polymer polyol (PMPO) in which a base polyol is continuously produced in a continuous base polyol reactor, the base polyol is continuously discharged from the continuous base polyol reactor, the base polyol is continuously introduced to a continuous PMPO reactor, which is different from the continuous base polyol reactor, and PMPO is continuously removed from the PMPO reactor. This disclosure also relates to production plants configured to carry out such processes.

BACKGROUND

Polymer polyols (PMPOs) are often commercially used to prepare polyurethane foams and elastomers. Slabstock and molded flexible polyurethane foams, for example, are commonly made using PMPOs. Slabstock flexible polyurethane foams are used in carpet, furniture and bedding applications, for example, while molded flexible polyurethane foams are commonly used in automotive applications.

PMPOs are typically produced by polymerizing one or more ethylenically unsaturated monomers dissolved or dispersed in a prepared polyol, sometimes referred to as a "base polyol", in the presence of a free radical catalyst to form a stable dispersion of polymer particles in the base polyol. Typically, polymer polyols used to produce polyurethane foams having higher load-bearing properties than those produced from unmodified polyols.

In many cases, the base polyol used to produce a PMPO is a polyether polyol produced by reacting an alkylene oxide with an H-functional starter in the presence of an aqueous solution of an alkali metal catalyst. Following the reaction, the alkali metal catalyst is neutralized, often with an acid, and the neutralized alkali metal catalyst removed, such as by filtration. Following additional work-up to remove water, the base polyol is stored in a storage tank prior to use as a base polyol in PMPO production. The need for such storage is undesirable due to, for example, the cost of expensive storage tanks, and the need to maintain inventory of base polyol.

In some cases, a double metal cyanide ("DMC")-catalyzed base polyol may be employed in producing PMPO. For example, a PMPO production process has been described in which an H-functional starter, a DMC catalyst, an unsaturated monomer, a radical initiator, and an alkylene oxide are combined in a reactor and alkoxylation of the starter and polymerization of the unsaturated monomer occurs simultaneously in the reactor, thereby simultaneously forming the base polyol and the polymer particles to produce a PMPO in one reactor. Such a process, however, has some drawbacks. For example, in such a process, alkylene oxide is present in the reactor during PMPO formation. This can result in little or no control over the composition and molecular weight distribution of the base polyol produced.

In addition, it is only thus far been shown possible to produce PMPO of relatively low solids content when the PMPO is produced in the same reactor as the base polyol.

It would be desirable to provide a process for producing PMPO, and a production plant for producing PMPO, in which the need for base polyol storage capacity, and the need for base polyol feed tanks in communication with a PMPO reactor, is eliminated. It would further be desired that such a process be capable of producing PMPO's having a relatively high solids content in which the composition and molecular weight distribution of the base polyol can be well-defined and controlled. The inventions described in this specification were made in view of the foregoing.

SUMMARY

In some respects, this disclosure relates to processes for preparing a PMPO. These processes comprise: a) continuously producing a base polyol having a functionality of 2 to 8 and a hydroxyl number of 10 to 1000 mg KOH/g in a continuous base polyol reactor; b) continuously discharging the base polyol from the continuous base polyol reactor; c) continuously introducing to a continuous PMPO reactor, which is different from the continuous base polyol reactor, components comprising: (1) the base polyol being continuously discharged from the continuous base polyol reactor; (2) an ethylenically unsaturated monomer, (3) a preformed stabilizer; and (4) a free radical initiator to continuously produce the PMPO; and d) continuously removing the PMPO from the reactor.

In other respects, this disclosure relates to production plants for producing PMPO. These plants comprise: a) a continuous base polyol reactor comprising: (1) an inlet in fluid communication with a source of alkylene oxide; (2) an inlet in fluid communication with a source of starter; (3) an inlet in fluid communication with a source of DMC catalyst; and (4) an outlet configured to continuously discharge a base polyol having a functionality of 2 to 8 and a hydroxyl number of 10 to 1000 mg KOH/g from the base polyol reactor; b) a continuous PMPO reactor comprising: (1) an inlet in fluid communication with the outlet of the base polyol reactor and configured to continuously receive the base polyol from the base polyol reactor as the base polyol is continuously discharged from the base polyol reactor; (2) an inlet in fluid communication with a source of ethylenically unsaturated monomer, (3) an inlet in fluid communication with a source of preformed stabilizer; (4) an inlet in fluid communication with a source of free radical initiator; and (5) an outlet configured to continuously discharge PMPO from the PMPO reactor.

DETAILED DESCRIPTION

Figure 1:
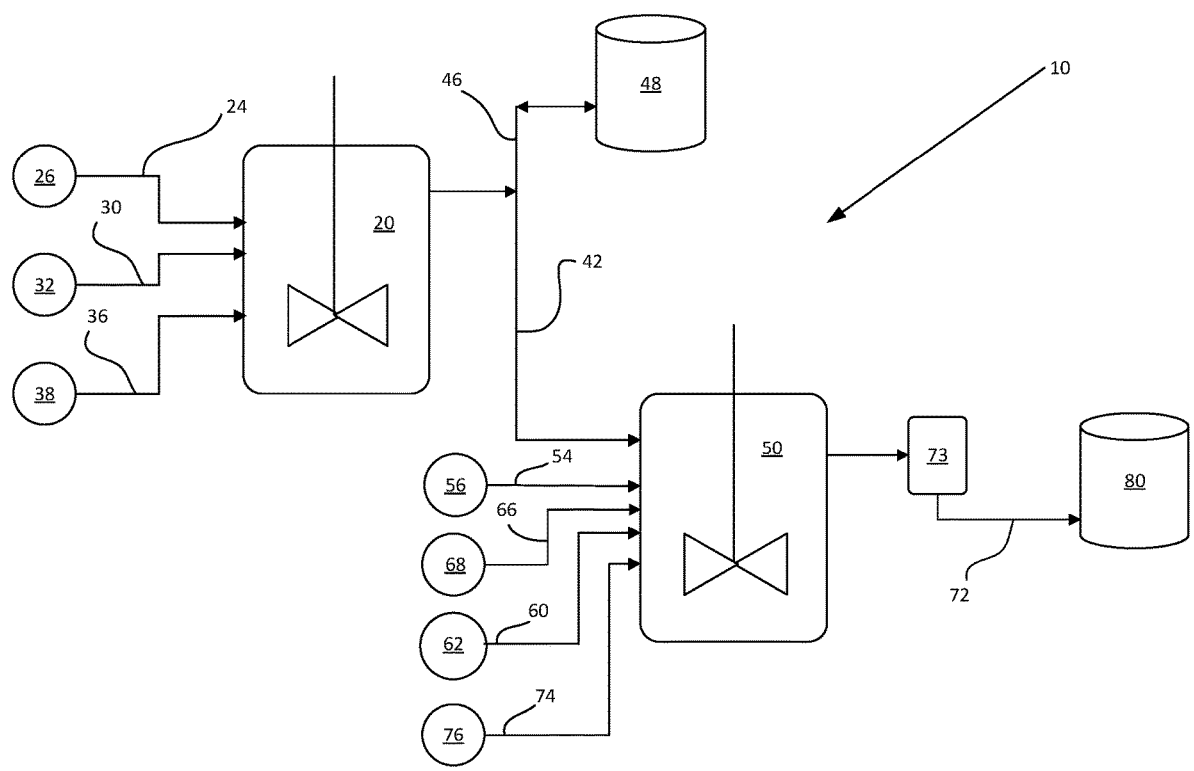
FIGS. 1-4 schematically represent production plants in accordance with embodiments of the inventions described in this specification.

Various implementations are described and illustrated in this specification to provide an overall understanding of the structure, function, properties, and use of the disclosed inventions. It is understood that the various implementations described and illustrated in this specification are non-limiting and non-exhaustive. Thus, the inventions are not limited by the description of the various non-limiting and non-exhaustive implementations disclosed in this specification.

The features and characteristics described in connection with various implementations may be combined with the features and characteristics of other implementations. Such modifications and variations are intended to be included within the scope of this specification. As such, the claims may be amended to recite any features or characteristics expressly or inherently described in, or otherwise expressly or inherently supported by, this specification. Further, Applicant(s) reserve the right to amend the claims to affirmatively disclaim features or characteristics that may be present in the prior art. Therefore, any such amendments comply with the requirements of 35 U.S.C. § 112 and 35 U.S.C. § 132(a). The various implementations disclosed and described in this specification can comprise, consist of, or consist essentially of the features and characteristics as variously described herein.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant(s) reserves the right to amend this specification to expressly recite any subject matter, or portion thereof, incorporated by reference herein.

In this specification, other than where otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. Accordingly, Applicant(s) reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112 and 35 U.S.C. § 132(a).

The grammatical articles "one", "a", "an", and "the", as used in this specification, are intended to include "at least one" or "one or more", unless otherwise expressly indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an implementation of the described implementations. Further, the use of a singular noun includes the plural, and the use of a plural noun includes the singular, unless the context of the usage requires otherwise.

As used herein, the term "functionality" refers to the average number of reactive hydroxyl groups, —OH, present per molecule of the —OH functional material that is being described. In the production of polyurethane foams, the hydroxyl groups react with isocyanate groups, —NCO, that are attached to the isocyanate compound. The term "hydroxyl number" refers to the number of reactive hydroxyl groups available for reaction, and is expressed as the number of milligrams of potassium hydroxide equivalent to the hydroxyl content of one gram of the polyol (ASTM D4274-16). The term "equivalent weight" refers to the weight of a compound divided by its valence. For a polyol, the equivalent weight is the weight of the polyol that will combine with an isocyanate group, and may be calculated by dividing the molecular weight of the polyol by its functionality. The equivalent weight of a polyol may also be calculated by dividing 56,100 by the hydroxyl number of the polyol—Equivalent Weight (g/eq)=(56.1×1000)/OH number.

The processes and production plants of this specification will now be described with reference to FIGS. 1-4. As indicated earlier, some embodiments of this specification relate to processes for preparing a PMPO. These processes comprise continuously producing a base polyol having a functionality of 2 to 8 and\a hydroxyl number of 10 to 1000 mg KOH/g in a continuous base polyol reactor. As used herein, the term "continuous" refers to a mode of addition of a relevant catalyst or reactant that maintains an effective concentration of the catalyst or reactant substantially continuously. Catalyst input, for example, may be truly continuous, or may be in relatively closely spaced increments. Likewise, continuous starter addition may be truly continuous, or may be incremental. Thus, it is possible to incrementally add a catalyst or reactant in such a manner that the added materials concentration decreases to essentially zero for some time prior to the next incremental addition. In some implementations, however, catalyst concentration is maintained at substantially the same level during the majority of the course of the continuous reaction and low molecular weight starter is present during the majority of the process. Incremental addition of catalyst and/or reactant which does not substantially affect the nature of the product is still "continuous" as that term is used herein. It is feasible, for example, to provide a recycle loop where a portion of the reacting mixture is back fed to a prior point in the process, thus smoothing out any discontinuities brought about by incremental additions.

Such continuous base polyol production can be conducted using any of a variety of continuous base polyol reactors, as is illustrated for FIGS. 1-4. For example, in some implementations, continuous base polyol production can take place using a single stage (FIG. 1) or a two stage (FIG. 2) continuous stirred tank reactor ("CSTR").

In particular, as shown in FIG. 1, production plant 10 may include a base polyol reactor 20 that is a single stage CSTR. In this implementation, an inlet of CSTR 20 is in fluid communication, via line 24, with a source of alkylene oxide 26, an inlet of CSTR 20 is in fluid communication, via line 30, with a source of H-functional starter 32, and an inlet of CSTR 20 is in fluid communication, via line 36, with a source of DMC catalyst 38. The various afore-mentioned inlets to CSTR 20 may be the same inlet or they may be different inlets (such as is depicted in FIG. 1). CSTR 20 is configured to continuously discharge a base polyol having a functionality of 2 to 8 and a hydroxyl number of 10 to 1000 mg KOH/g from CSTR 20. As is apparent, an outlet of CSTR 20 is in fluid communication, via line 42, with PMPO reactor 50. Also, in this implementation, an outlet of CSTR 20 is in fluid communication, via line 46, with base polyol storage vessel 48, which, in turn, is also in fluid communication, via line 42, with an inlet of PMPO reactor 50. In some implementations, line 42 may be configured to serve as a post-reaction device or space in which the residual oxide content of the base polyol exiting CSTR 20 is reduced, such as to a level of 100 ppm or less, prior to base polyol entering PMPO reactor 50.

An inlet of PMPO reactor 50 is thus configured to continuously receive base polyol from CSTR 20 as base polyol is continuously discharged from CSTR 20. In addition, in this implementation, an inlet of PMPO reactor 50 is configured to continuously receive base polyol from base polyol storage vessel 48. As a result, in operation, PMPO reactor 50 may continuously receive base polyol from CSTR 20, continuously receive base polyol from base polyol storage vessel 48, or may continuously receive base polyol from both CSTR 20 and base polyol storage vessel 48 simultaneously. In addition, in the implementation depicted in FIG. 1, PMPO reactor 50 also comprises an inlet in fluid communication, via line 54, with a source of ethylenically unsaturated monomer 56, an inlet in fluid communication, via line 60, with a source of preformed stabilizer 62, an inlet in fluid communication, via line 66, with a source of free radical initiator 68, and an outlet configured to continuously discharge PMPO from the PMPO reactor 50. The outlet of PMPO reactor 50 is in fluid communication, via line 72 and PMPO stripping system (such as a falling film evaporator) 73, with a PMPO storage tank 80. As is also shown, PMPO reactor 50 may also include an inlet in fluid communication, via line 74, with a source of chain transfer agent 76. The various afore-mentioned inlets to PMPO reactor 50 may be the same inlet or they may be different inlets (such as is depicted in FIG. 1).

Figure 2:
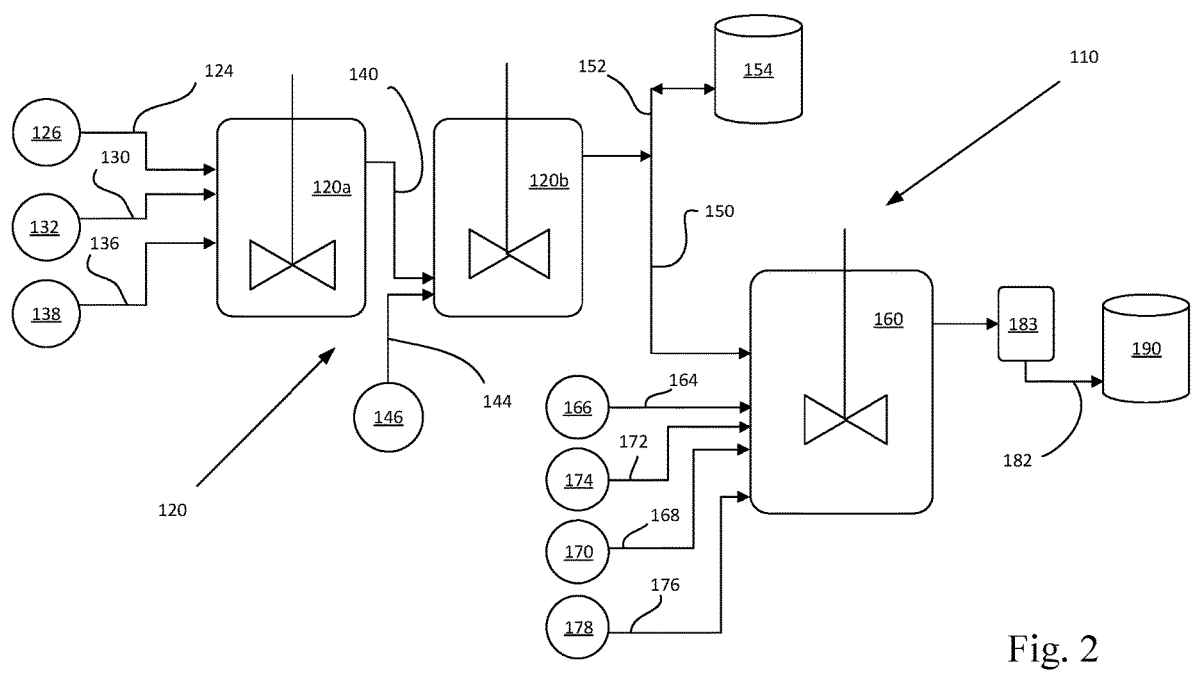

In another implementation, as shown in FIG. 2, production plant 110 may include a base polyol reactor 120 that is a two stage CSTR comprising first stage CSTR 120a and second stage CSTR 120b. In this implementation, first stage CSTR 120a comprises an inlet in fluid communication, via line 124, with a source of alkylene oxide 126, an inlet in fluid communication, via line 130, with a source of H-functional starter 132, and an inlet in fluid communication, via line 136 with a source of DMC catalyst 138. The various afore-mentioned inlets to CSTR 120a may be the same inlet or they may be different inlets (such as is depicted in FIG. 2). CSTR 120a also has an outlet configured to continuously discharge, via line 140, a base polyol having a functionality of 2 to 8 and a hydroxyl number of 10 to 1000 mg KOH/g from first stage CSTR 120a to second stage CSTR 120b. In addition, in this implementation, second stage CSTR 120b includes an inlet in fluid communication, via line 144, with a source of alkylene oxide 146. Alkylene oxide source 146 may be the same as alkylene oxide source 126 or it may be a different source. Thus, in the implementation depicted in FIG. 2, alkylene oxide may be added at multiple locations within base polyol reactor 120. Second stage CSTR 120b comprises an outlet in fluid communication, via line 150, with inlet of PMPO reactor 160. Also, in this implementation, the outlet of second stage CSTR 120b is also in fluid communication, via line 152, with base polyol storage vessel 154, which, in turn, is also in fluid communication, via line 150, with an inlet of PMPO reactor 160. In some implementations, line 150 may be configured to serve as a post-reaction device or space in which the residual oxide content of the base polyol exiting CSTR 120b is reduced, such as to a level of 100 ppm or less, prior to base polyol entering PMPO reactor 160.

An inlet of PMPO reactor 160 is thus configured to continuously receive base polyol from second stage CSTR 120b as base polyol is continuously discharged from second stage CSTR 120b. In addition, in this implementation, an inlet of PMPO reactor 160 is also configured to continuously receive base polyol from base polyol storage vessel 154. As a result, in operation, PMPO reactor 160 may continuously receive base polyol from second stage CSTR 120b, continuously receive base polyol from base polyol storage vessel 154, or may continuously receive base polyol from both second stage CSTR 120b and base polyol storage vessel 154 simultaneously. In addition, in the implementation depicted in FIG. 2, PMPO reactor 160 also comprises an inlet in fluid communication, via line 164, with a source of ethylenically unsaturated monomer 166, an inlet in fluid communication, via line 168, with a source of preformed stabilizer 170, an inlet in fluid communication, via line 172, with a source of free radical initiator 174, and an outlet configured to continuously discharge PMPO from the PMPO reactor 160. The outlet of PMPO reactor 160 is in fluid communication, via line 182 and PMPO stripping system (such as a falling film evaporator) 183, with a PMPO storage tank 190. As is also shown, PMPO reactor 160 may also include an inlet in fluid communication, via line 176, with a source of chain transfer agent 178. The various afore-mentioned inlets to PMPO reactor 160 may be the same inlet or they may be different inlets (such as is depicted in FIG. 2).

Figure 3:
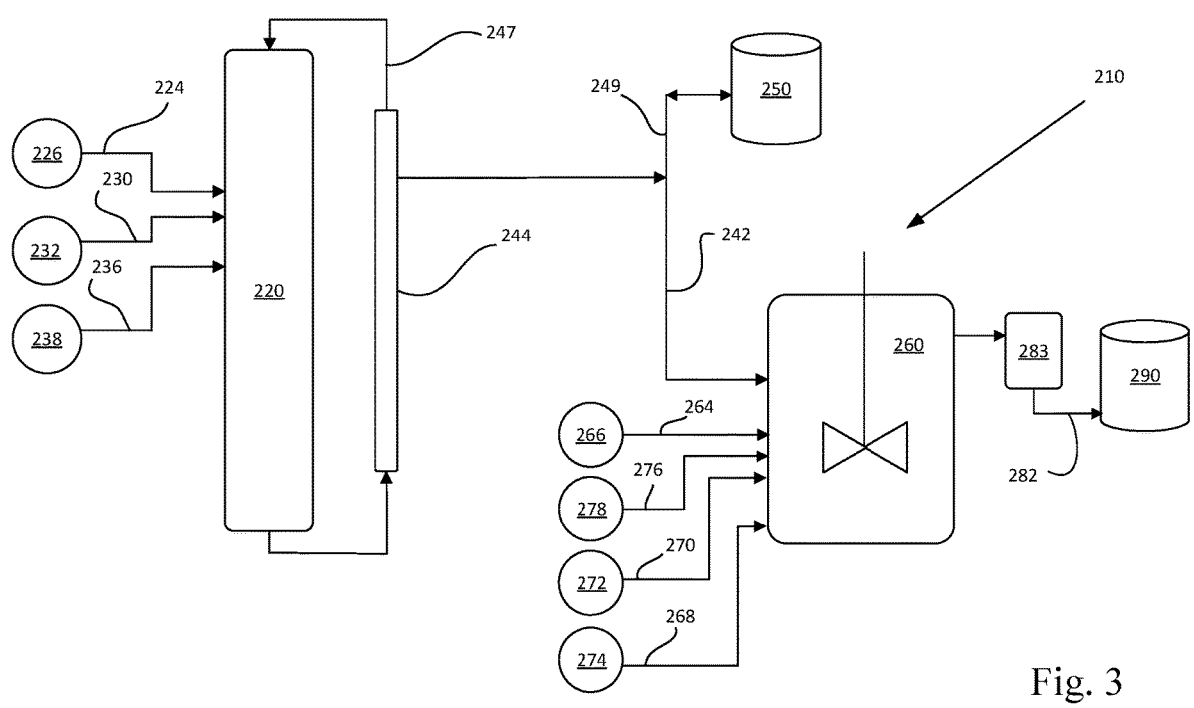

In yet another implementation, as illustrated by FIG. 3, production plant 210 may include a base polyol reactor 220 that is a loop reactor. A loop reactor is a reactor with internal and/or external (as shown in FIG. 3), recycling of substances (optionally, as shown in FIG. 3, with a heat exchanger arranged in the circulation). Exemplary loop reactors for use as loop reactor 220 include, without limitation, stream loop reactors, jet loop reactors, and Venturi loop reactors, tube reactors configured in loop form with suitable devices for circulating the reaction mixture, as well as a loop of several tube reactors connected in series or several stirred tanks connected in series. Thus, as is seen in the implementation depicted in FIG. 3, loop reactor 220 comprises an inlet in fluid communication, via line 224, with a source of alkylene oxide 226, an inlet in fluid communication, via line 230, with a source of H-functional starter 232, an inlet in fluid communication, via line 236, with a source of DMC catalyst 238, and an outlet configured to continuously discharge a base polyol having a functionality of 2 to 8 and a hydroxyl number of 10 to 1000 mg KOH/g from loop reactor 220, in which the outlet of loop reactor 220 is in fluid communication, via line 242 and heat exchanger 244, with inlet of PMPO reactor 260 and is also in fluid communication, via line 247 and heat exchanger 244, with an inlet of loop reactor 220. The various afore-mentioned inlets to loop reactor 220 may be the same inlet or they may be different inlets (such as is depicted in FIG. 3). Also, in this implementation, the outlet of loop reactor 220 is also in fluid communication, via line 249, with base polyol storage vessel 250, which, in turn, is also in fluid communication, via line 242, with an inlet of PMPO reactor 260. In some implementations, line 242 may be configured to serve as a post-reaction device or space in which the residual oxide content of the base polyol exiting loop reactor 220 is reduced, such as to a level of 100 ppm or less, prior to base polyol entering PMPO reactor 260.

An inlet of PMPO reactor 260 is thus configured to continuously receive base polyol from loop reactor 220 as base polyol is continuously discharged from loop reactor 220. In addition, in this implementation, an inlet of PMPO reactor 260 is also configured to continuously receive base polyol from base polyol storage vessel 250. As a result, in operation, PMPO reactor 260 may continuously receive base polyol from loop reactor 220, continuously receive base polyol from base polyol storage vessel 250, or may continuously receive base polyol from both loop reactor 220 and base polyol storage vessel 250 simultaneously. In addition, in the implementation depicted in FIG. 3, PMPO reactor 260 also comprises an inlet in fluid communication, via line 264, with a source of ethylenically unsaturated monomer 266, an inlet in fluid communication, via line 270, with a source of preformed stabilizer 272, an inlet in fluid communication, via line 276, with a source of free radical initiator 278, and an outlet configured to continuously discharge PMPO from the PMPO reactor 260. The outlet of PMPO reactor 260 is in fluid communication, via line 282 and PMPO stripping system (such as a falling film evaporator) 283, with a PMPO storage tank 290. As is also shown, PMPO reactor 260 may also include an inlet in fluid communication, via line 268, with a source of chain transfer agent 274. The various afore-mentioned inlets to PMPO reactor 260 may be the same inlet or they may be different inlets (such as is depicted in FIG. 3).

Figure 4:
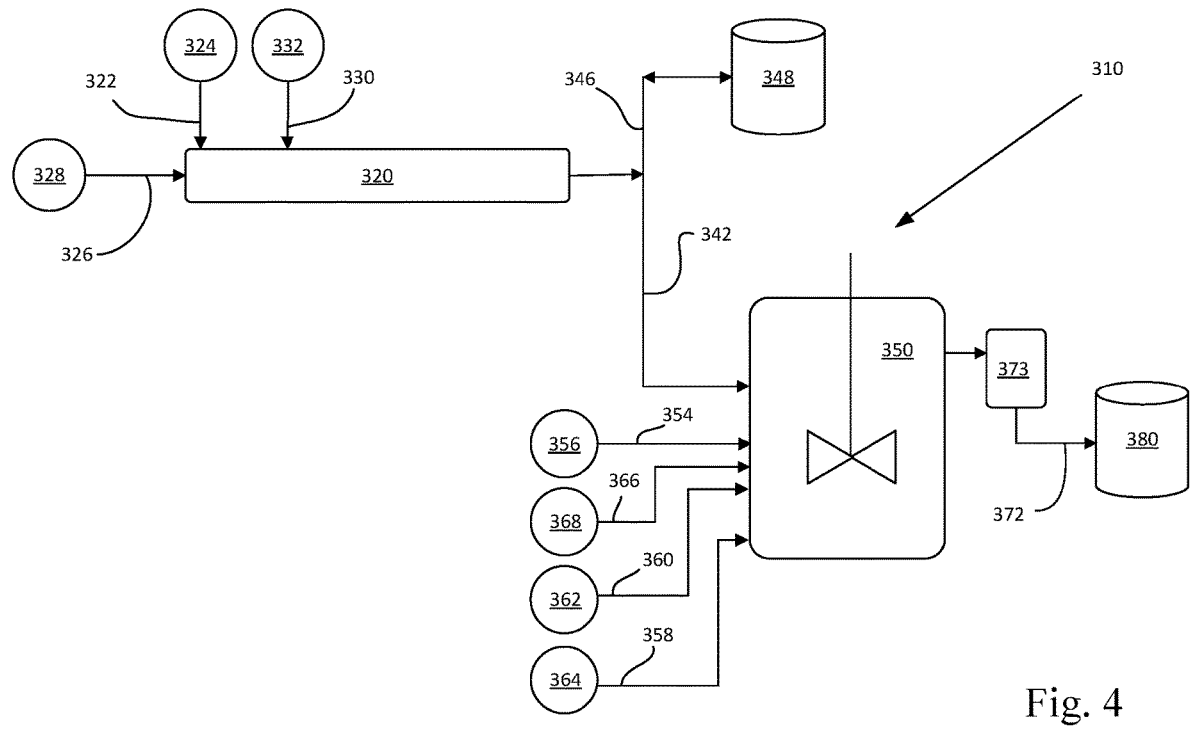

In yet another implementation, as is illustrated by FIG. 4, production plant 310 may include a base polyol reactor 320 that is a plug flow reactor. The plug flow reactor 320 comprises an inlet in fluid communication, via line 322, with a source of alkylene oxide 324, an inlet in fluid communication, via line 326, with a source of H-functional starter 328, an inlet in fluid communication, via line 330, with a source of DMC catalyst 332, and an outlet configured to continuously discharge a base polyol having a functionality of 2 to 8 and a hydroxyl number of 10 to 1000 mg KOH/g from plug flow reactor 320. The various afore-mentioned inlets to plug flow reactor 320 may be the same inlet or they may be different inlets (such as is depicted in FIG. 4). In such a plug flow reactor, the initially introduced reactants flow as a substantially coherent "plug" through the reactor. Thus, H-functional starter can be introduced at the inlet as an activated catalyst/starter mixture. This starter is rapidly oxyalkylated to higher molecular weight products, and thus within a short time after introduction, low molecular weight starter concentration drops to zero as molecular weight builds due to continuous addition of alkylene oxide. As is apparent, the outlet of plug flow reactor 320 is in fluid communication, via line 342, with inlet of PMPO reactor 350. Also, in this implementation, the outlet of plug flow reactor 320 is also in fluid communication, via line 346, with base polyol storage vessel 348, which, in turn, is also in fluid communication, via line 342, with the inlet of PMPO reactor 350. In some implementations, line 342 may be configured to serve as a post-reaction device or space in which the residual oxide content of the base polyol exiting plug flow reactor 320 is reduced, such as to a level of 100 ppm or less, prior to base polyol entering PMPO reactor 350.

An inlet of PMPO reactor 350 is thus configured to continuously receive base polyol from plug flow reactor 320 as base polyol is continuously discharged from plug flow reactor 320. In addition, in this implementation, an inlet of PMPO reactor 350 is also configured to continuously receive base polyol from base polyol storage vessel 348. As a result, in operation, PMPO reactor 350 may continuously receive base polyol from plug flow reactor 320, continuously receive base polyol from base polyol storage vessel 348, or may continuously receive base polyol from both plug flow reactor 320 and base polyol storage vessel 348 simultaneously. In addition, in the implementation depicted in FIG. 4, PMPO reactor 350 also comprises an inlet in fluid communication, via line 354, with a source of ethylenically unsaturated monomer 356, an inlet in fluid communication, via line 360, with a source of preformed stabilizer 362, an inlet in fluid communication, via line 366, with a source of free radical initiator 368, and an outlet configured to continuously discharge PMPO from the PMPO reactor 350. The outlet of PMPO reactor 350 is in fluid communication, via line 372 and PMPO stripping system (such as a falling film evaporator) 373, with a PMPO storage tank 380. As is also shown, PMPO reactor 350 may also include an inlet in fluid communication, via line 358, with a source of chain transfer agent 364. The various afore-mentioned inlets to PMPO reactor 350 may be the same inlet or they may be different inlets (such as is depicted in FIG. 4).

In some implementations, such as implementations in which the base polyol reactor comprises a single stage CSTR a two stage CSTR, or a loop reactor (as shown in FIGS. 1-3), the processes of this specification comprise continuously producing the base polyol by a process comprising: (1) introducing into the continuous base polyol reactor a mixture comprising a DMC catalyst and an initial starter, wherein the mixture is added in an amount sufficient to initiate polyoxyalkylation of the initial starter after introduction of alkylene oxide into the base polyol reactor; (2) introducing the alkylene oxide to the base polyol reactor; (3) continuously introducing a continuously added starter into the base polyol reactor; and (4) continuously introducing fresh DMC catalyst and/or further DMC catalyst/further starter mixture to the base polyol reactor such that catalytic activity of the DMC catalyst is maintained.

The starter(s) employed may be any compound having active hydrogen atoms. Suitable starters include, but are not limited to, compounds having a number average molecular weight of 18 to 2,000, such as 62 to 2,000, and having 1 to 8 hydroxyl groups. Specific examples of suitable starters include, but are not limited to, polyoxypropylene polyols, polyoxyethylene polyols, polytetatramethylene ether glycols, glycerol, propoxylated glycerols, propylene glycol, ethylene glycol, tripropylene glycol, trimethylol propane alkoxylated allylic alcohols, bisphenol A, pentaerythritol, sorbitol, sucrose, degraded starch, water and mixtures thereof.

In certain embodiments, the starter used to prepare the DMC catalyst/starter mixture introduced in the above-mentioned step (1) is an oligomeric starter, such as an oxyalkylated oligomer based on the same low molecular weight starter whose continuous addition is to be used in the above-mentioned step (3). For example, where propylene glycol is to be continuously added to the reactor in step (3), a suitable oligomeric starter useful in preparing the activated catalyst/starter mixture may be a 300 Da to 1,000 Da molecular weight polyoxypropylene glycol. The same oligomeric starter would also be suitable for use where dipropylene glycol and/or water are continuously added starters.

In another example, where glycerin is a continuously added starter, an oxypropylated glycerine polyol having a molecular weight of 400 Da to 1,500 Da may advantageously be used in the above-mentioned step (1). In some implementations, however, a monomeric starter, such as ethylene glycol, propylene glycol, and the like, may be used. Thus, in some implementations, the starter used to prepare the catalyst/starter mixture in the above-mentioned step (1) may be the same as the continuously added starter used in the above-mentioned step (3).

In certain implementations, the continuously added starter may comprise water, ethylene glycol, diethylene glycol, triethylene glycol, propylene glycol, dipropylene glycol, tripropylene glycol, 1,2-, 1,3-, and/or 1,4-butylene glycol, neopentyl glycol, glycerin, trimethylolpropane, triethylolpropane, pentaerythritol, α-methylglucoside, hydroxymethyl-, hydroxyethyl-, and/or hydroxypropylglucoside, sorbitol, mannitol, sucrose, tetrakis [2 hydroxyethyl and/or 2-hydroxypropyl]ethylene diamine, as well as mixtures of any two or more thereof. Also suitable are monofunctional starters such as methanol, ethanol, 1-propanol, 2-propanol, n-butanol, 2-butanol, 2 ethylhexanol, and the like, as well as phenol, catechol, 4,4' dihydroxybiphenyl, and 4,4'-dihydroxydiphenylmethane, including mixtures of any two or more of the foregoing.

In some implementations, the continuously added starter comprises a polyoxyalkylene polymer or copolymer or suitable initiator for the production thereof, which has a molecular weight less than the desired product weight. Thus, the molecular weight of the continuously added starter may vary from 18 Da (water) to 45,000 Da (high molecular weight polyoxyalkylene polyol). In some implementations, the continuously added starter may comprise a starter having a molecular weight less than 1,000 Da, such as less than 500 Da, or less than 300 Da.

Alkylene oxides suitable for introduction in the aforementioned step (2) include, but are not limited to, ethylene oxide, propylene oxide, oxetane, 1,2- and 2,3-butylene oxide, isobutylene oxide, epichlorohydrin, cyclohexene oxide, styrene oxide, and the higher alkylene oxides such as the $C_5$-$C_{30}$ α-alkylene oxides. In some implementations, a mixture of propylene oxide and ethylene oxide may be used, such as those with high ethylene oxide content, i.e., up to 85 mol percent. In some implementations, propylene oxide alone or a mixture of propylene oxide with ethylene oxide or another alkylene oxide is used. Other polymerizable monomers may be used as well, such as anhydrides and/or carbon dioxide (thus producing a polyether carbonate polyol).

The process for producing the base polyol may employ any double metal cyanide (DMC) catalyst. DMC catalysts are non-stoichiometric complexes of a low molecular weight organic complexing agent and optionally other complexing agents with a double metal cyanide salt, such as zinc hexacyanocobaltate. Exemplary suitable DMC catalysts include those suitable for preparation of low unsaturation polyoxyalkylene polyether polyols, such as are disclosed in U.S. Pat. Nos. 3,427,256; 3,427,334; 3,427,335; 3,829,505; 4,472,560; 4,477,589; and 5,158,922, each of which being incorporated herein by reference. In some implementations, the DMC catalyst comprises one that is capable of preparing "ultra-low" unsaturation polyether polyols, such as are disclosed in U.S. Pat. Nos. 5,470,813, 5,482,908, and 5,545,601, each of which being incorporated by reference thereto.

The DMC catalyst concentration is desirably chosen to provide adequate control of the polyoxyalkylation reaction under the given reaction conditions. In some implementations, the DMC catalyst is used in an amount of 0.0005 to 1% by weight, such as 0.001 to 0.1% by weight, or, in some cases, 0.001 to 0.01% by weight, based on the amount of polyether polyol to be produced.

An organic complexing ligand may be included with the DMC catalyst. Any organic complexing ligand may be part of the DMC catalyst, such as those described in U.S. Pat. Nos. 3,404,109, 3,829,505, 3,941,849, 5,158,922 and 5,470,813, EP 700 949, EP 761 708, EP 743 093, WO 97/40086 and JP 4145123. Such organic complexing ligands include water-soluble organic compounds with heteroatoms, such as oxygen, nitrogen, phosphorus or sulfur, which can form complexes with the DMC compound. In some implementations, the organic complexing ligand comprises an alcohol, aldehyde, ketone, ether, ester, amide, urea, nitrile, sulfide, or a mixture of any two or more thereof. In some implementations, the organic complexing ligands comprises a water-soluble aliphatic alcohol, such as, for example, ethanol, isopropanol, n-butanol, iso-butanol, sec-butanol, tert-butanol, or a mixture of any two or more thereof.

The DMC catalyst may contain a functionalized polymer. As used herein, the term "functionalized polymer" refers to a polymer or its salt that contains a functional group, such as oxygen, nitrogen, sulfur, phosphorus, halogen, or a mixture of any two or more thereof. Specific examples of suitable functionalized polymer include, but are not limited to, polyethers, polyesters, polycarbonates, polyalkylene glycol sorbitan esters, polyalkylene glycol glycidyl ethers, polyacrylamides, poly(acrylamide-co-acrylic acids), polyacrylic acids, poly(acrylic acid-co-maleic acids), poly(N-vinylpyrrolidone-co-acrylic acids), poly(acrylic acid-co-styrenes) and the salts thereof, maleic acids, styrenes and maleic anhydride copolymers and the salts thereof, block copolymers composed of branched chain ethoxylated alcohols, alkoxylated alcohols, polyether, polyacrylonitriles, polyalkyl acrylates, polyalkyl methacrylates, polyvinyl methyl ethers, polyvinyl ethyl ethers, polyvinyl acetates, polyvinyl alcohols, poly-N-vinylpyrrolidones, polyvinyl methyl ketones, poly(4-vinylphenols), oxazoline polymers, polyalkyleneimines, hydroxyethylcelluloses, polyacetals, glycidyl ethers, glycosides, carboxylic acid esters of polyhydric alcohols, bile acids and their salts, esters or amides, cyclodextrins, phosphorus compounds, unsaturated carboxylic acid esters and ionic surface- or interface-active compounds.

In some implementations, where used, functionalized polymer is present in the DMC catalyst in an amount of 2 to 80% by weight, 5 to 70% by weight, or, in some cases, 10 to 60% by weight, based on the total weight of DMC catalyst.

The DMC catalyst may or may not be activated prior to use in the process of preparing the base polyol. Activation, when desired, involves mixing the catalyst with a starter molecule having a desired number of oxyalkylatable hydrogen atoms, and adding alkylene oxide, preferably propylene oxide or other higher alkylene oxide under pressure and monitoring the reactor pressure. The reactor may be maintained at a temperature of, for example, 90° ° C. to 150° C., 100° ° C. to 140° C., or, in some cases, 110° C. to 130° C. A noticeable pressure drop in the reactor indicates that the catalyst has been activated. The same alkylene oxide(s) as is to be employed in to produce the base polyol may be used to prepare activated catalyst, or a different alkylene oxide may be employed. With higher alkylene oxides having low vapor pressure, a volatile alkylene oxide such as ethylene oxide, oxetane, 1,2-butylene oxide, 2,3-butylene oxide, or isobutylene oxide may be employed in lieu of or in conjunction with the higher alkylene oxide to facilitate pressure monitoring. Alternatively, other methods of measuring alkylene oxide concentration (GC, GC/MS, HPLC, etc.) may be used. A noticeable reduction in free alkylene oxide concentration indicates activation.

In some cases, however, "fresh" DMC catalyst may be employed without activation. "Fresh" catalyst as used herein is freshly prepared, non-activated DMC catalyst, i.e., non-activated DMC catalyst in solid form or in the form of a slurry in low molecular weight starter, polyoxyalkylated low molecular weight starter, or a non-starter liquid. In some implementations, all or a substantial portion of the liquid phase of a fresh DMC catalyst mixture will include the same low molecular weight starter used for continuous starter addition, a polyoxyalkylated low molecular weight starter.

In some implementations, a portion of the base polyol product, or preferably, a portion of intermediate base polyol may be cycled back to a catalyst activation reactor and employed for catalyst activation.

In preparing the base polyol, according to some embodiments, the addition of starter is continuous in the sense that a concentration of low molecular weight starter and/or its low molecular weight oxyalkylated oligomers is maintained for a substantial portion of the total oxyalkylation. In a tube reactor, for example, starter may be introduced separately at numerous points along the reactor, or dissolved in alkylene oxide and introduced along the length of the reactor. In a CSTR, starter may be added to alkylene oxide, and may be added at numerous locations within the reactor. Low molecular weight starter need not even be present in the catalyst/starter mixture, which may employ a much higher molecular weight starter. By whatever method added, low molecular weight starter should be present for a substantial portion of oxyalkylation, such as 50% of oxyalkylation, 70% of the alkoxylation, or more. In some implementations, a low molecular weight starter concentration is maintained for a portion of the oxyalkylation which is effective to reduce the proportion of high molecular weight tail in the base polyol product as compared what would be produced in a batch process where all starter is added at once.

The amount of continuously added starter may be increased to very high levels without unduly broadening molecular weight distribution. The continuously added starter may represent in excess of 90 equivalent percent of total starter, such as where the percentage of continuously added starter is 98 to 99+%. Despite the continuous addition of starter, polydispersity is generally below 1.7, such as below 1.3 to 1.4, or 1.05 to 1.20.

In preparing the base polyol, it may desirable to have a small concentration of starter present in the reaction mixture at all times, although a final "cook out" to facilitate complete reaction of alkylene oxide may be performed without starter present. Continuous addition of as little as 1-2 equivalent percent of starter relative to total product weight may be effective to substantially eliminate the high molecular weight tail. However, despite the continuous addition of a very significant, and in some cases, major amount of low molecular weight starter, the molecular weight distribution is usually not significantly broadened and products of very low polydispersity are obtained.

As indicated, in some implementations, the continuous process of preparing the base polyol involves establishing oxyalkylation conditions in a continuous reactor. Thus, when it is stated herein that a mixture comprising a DMC catalyst and an initial starter is introduced into the continuous base polyol reactor "in an amount sufficient to initiate polyoxyalkylation of the initial starter after introduction of alkylene oxide into the base polyol reactor" it merely means that oxyalkylation conditions are established at some point in time. For example, an initial establishing of oxyalkylation conditions does not need repeating. Following establishment of oxyalkylation conditions, only the addition of alkylene oxide, continuously added starter, and further catalyst need be maintained.

Moreover, the term "starter" as employed in the phrase "DMC catalyst/initial starter" refers to an oxyalkylatable molecule of any molecular weight. This oxyalkylatable molecule may be a low molecular weight starter molecule having a molecular weight below about 300 Da, e.g. propylene glycol, dipropylene glycol, glycerine, a three mole oxypropylate of glycerine, etc., or may be a much higher molecular weight molecule, for example the product of desired product molecular weight.

Suitable processes and equipment for continuously producing a base polyol having a functionality of 2 to 8 and a hydroxyl number of 10 to 1000 mg KOH/g in a continuous base polyol, which are suitable for use in the processes for preparing a PMPO of this specification, are described in U.S. Pat. No. 5,689,012 at col. 5, line 55 to col. 17, line 16, the cited portion of which being incorporated herein by reference.

As previously mentioned, the process for preparing a PMPO of this specification comprises continuously discharging the base polyol from the continuous base polyol reactor and continuously introducing to a continuous PMPO reactor, which is different from the continuous base polyol reactor, components comprising: (1) the base polyol being continuously discharged from the continuous base polyol reactor; (2) an ethylenically unsaturated monomer, (3) a preformed stabilizer; and (4) a free radical initiator; and d) continuously removing the PMPO from the reactor, the PMPO having a solids content of 30% to 75% by weight, such as 35% to 65% by weight or 40 to 55% by weight, based on the total weight of the PMPO. Further, in some implementations, the PMPO has a total ethylene oxide content of up to 25% by weight (such as 1 to 23% by weight, 2 to 20% by weight, or, in some cases, 3 to 15% by weight or 5% to 15% by weight), with an ethylene oxide content of up to 40% by weight (such as 1 to 35% by weight, 2 to 25%, 5 to 20% by weight, or, in some cases 8 to 20% by weight) in the base polyol, and a viscosity at 25° C. of no more than 15,000 mPas (such as no more than 13,000 mPas, no more than 11,000 mPas, or no more than 8,000 mPas).

Suitable base polyols for preparing the PMPO, which is continuous discharged from the base polyol reactor and continuous introduced to the PMPO reactor, include, for example, polyether polyols having a functionality 2 to 8, such as 3 to 6. In some implementations, the OH numbers of such base polyols is 10 to 1000 mg KOH/g polyol, such as 20 to 400 mg KOH/g polyol, or, in some cases, 30 to 200 mg KOH/g polyol. In some implementations, the molecular weight of such base polyols 700 to 14,000 g/mol, such as 1000 to 12,000 g/mol, or, in some cases, 2000 to 10,000 g/mol.

Specific examples of suitable base polyols for use in the processes of this specification are, without limitation, polyoxyethylene glycols, triols, tetrols and higher functionality polyols, polyoxypropylene glycols, triols, tetrols and higher functionality polyols, as well as mixtures thereof. When alkylene oxide mixtures are used to produce the base polyol, the ethylene oxide and propylene oxide, for example, may be added simultaneously or sequentially to provide internal blocks, terminal blocks or random distribution of the oxyethylene groups and/or oxypropylene groups in the polyether polyol. Suitable starters or initiators for preparing the base polyol include those described earlier in this specification.

Suitable compounds to be used as component (2) in preparing the PMPO, the unsaturated monomer(s), include, for example, aliphatic conjugated dienes, such as butadiene and isoprene; monovinylidene aromatic monomers, such as styrene, α-methyl-styrene, (t-butyl)styrene, chlorostyrene, cyanostyrene and bromostyrene; α,β-ethylenically unsaturated carboxylic acids and esters thereof, such as acrylic acid, methacrylic acid, methyl methacrylate, ethyl acrylate, 2-hydroxyethyl acrylate, butyl acetylate, itaconic acid, and maleic anhydride; α,β-ethylenically unsaturated nitriles and amides, such as acrylonitrile, methacrylonitrile, acrylamide, methacrylamide, N,N-dimethyl acrylamide, and N-(dimethylaminomethyl)-acrylamide; vinyl esters, such as vinyl acetate; vinyl ethers, vinyl ketones, vinyl and vinylidene halides, among other ethylenically unsaturated materials. Of course, mixtures of two or more of the aforementioned monomers are also suitable. In some implementations, the ethylenically unsaturated monomer comprises styrene and its derivatives, acrylonitrile, methyl acrylate, methyl methacrylate, vinylidene chloride, or a combination thereof, such as a combination of styrene and acrylonitrile, such as a combination of styrene and acrylonitrile in which the weight ratio of styrene to acrylonitrile (S:AN) is 80:20 to 20:80, such as 75:25 to 2:75, or, in some cases, 70:30 to 30:70.

Suitable preformed stabilizers to be used as component (3) in preparing the PMPO include, for example, a reaction product of a reaction mixture comprising: (a) a macromer that contains reactive unsaturation; (b) an ethylenically unsaturated monomer; (c) a free radical initiator; (d) a polymer control agent; and, optionally, (e) a diluent.

Suitable macromers include a reaction product of a reaction mixture comprising: (i) a starter compound having a functionality of 2 to 8, and a hydroxyl number of 20 to 50; (ii) 0.1 to 3% by weight, based on 100% by weight of the sum of components (i), (ii) and (iii), of a hydroxyl-reactive compound that contains reactive unsaturation; and (iii) from 0 to 30% by weight, based on 100% by weight of the sum of components (i), (ii) and (iii), of a diisocyanate. Specific examples of suitable macromers, as well as methods for their preparation, are described in United States Patent Application Publication No. US 2017/0306076 A1 at [0103]-[0116], the cited portion of which being incorporated herein by reference.

Suitable ethylenically unsaturated monomers to be used as component (b) above in preparing the preformed stabilizer include, for example, those describer earlier with respect to preparing the PMPO.

Suitable free radical polymerization initiators for use as component (c) in preparing the preformed stabilizer, and suitable amounts, are described in in United States Patent Application Publication No. US 2017/0306076 A1 at [0120]-[0122], the cited portion of which being incorporated herein by reference.

Components (a), (b), and (c) of the pre-formed stabilizer are soluble in (d) the polymer control agent. However, the resultant preformed stabilizer (3) is essentially insoluble in (d) the polymer control agent. Suitable compounds to be used as polymer control agents include various mono-ols (i.e. monohydroxy alcohols), aromatic hydrocarbons, ethers, and other liquids, such as those described in, for example, U.S. Pat. Nos. 3,953,393, 4,119,586, 4,463,107, 5,324,774, 5,814,699 and 6,624,209, the disclosures of which are herein incorporated by reference. Mixtures of two or more such compounds, such as two or mono-ols, may be used as polymer control agents. In some implementations, the mono-ol is an alcohol containing at least one carbon atom, such as methanol, ethanol, n-propanol, isopropanol, n-butanol, sec.-butanol, t-butanol, n-pentanol, 2-pentanol, 3-pentanol, or a mixture thereof. Other suitable polymer control agents include, for example, ethylbenzene and toluene.

Suitable compounds to be used as component (e) the diluent of the preformed stabilizer are described in United States Patent Application Publication No. US 2017/0306076 A1 at [0126], the cited portion of which being incorporated herein by reference.

Suitable processes for preparing the preformed stabilizer are described in in United States Patent Application Publication No. US 2017/0306076 A1 at [0130]-[0131], the cited portion of which being incorporated herein by reference.

Suitable free-radical initiators to be used as component (4) in preparing the PMPO include, for example, those described earlier with respect to preparing the stabilizer. Specific examples of suitable free-radical polymerization initiators for preparing the PMPO include, without limitation, peroxides including both alkyl and aryl hydroperoxides, persulfates, peresters, perborates, percarbonates, and azo compounds. Some specific examples include hydrogen peroxide, di(t-butyl)-peroxide, t-butylperoxy diethyl acetate, t-butyl peroctoate, t-butyl peroxy isobutyrate, t-butyl peroxy 3,5,5-trimethyl hexanoate, t-butyl perbenzoate, t-butyl peroxypivalate, t-amyl peroxypivalate, t-butyl peroxy-2-ethyl hexanoate, lauroyl peroxide, cumene hydroperoxide, t-butyl hydroperoxide, azobis(isobutyronitrile), and 2,2'-azo bis-(2-methylbutyronitrile).

In some implementations, the free-radical initiator has a satisfactory half-life within the temperature ranges used in forming the PMPO, such as a half-life that is 25% or less of the residence time in the reactor at any given time.

The free-radical initiator, such as peroxide, can be used in essentially pure form, or may be diluted to lower concentration using an appropriate diluent, such as aliphatic or aromatic hydrocarbons, mono-ols, and polyether polyols. The quantity of free-radical initiator used can vary, though, in some implementations, the amount is 0.01 to 2% by weight, based on the total weight of the final PMPO.

The free-radical initiator may be added to the PMPO reactor using any of a variety of methods. The free-radical initiator may be premixed by addition to the base polyol and/or the preformed stabilizer feed lines before entering the PMPO reactor. Another option is for an independent free-radical initiator feed stream entering at the same point as other component streams or immediately thereafter prior to entering the PMPO reactor. For instance, the a free-radical initiator feed vessel can transport material to a header system capable of feeding the initiator to single and/or multiple reactors simultaneously. In another implementation, the initiator may be fed to single and/or multiple reactors via a recirculation line from an initiator feed vessel. The recirculation line carries initiator from and back to the initiator feed vessel, with independent initiator feed lines directed from the recirculation line to each PMPO reactor.

In addition, the process of preparing the PMPO may including continuously introducing a chain transfer agent to the PMPO reactor. Suitable chain transfer agents include, without limitation, mercaptans, such as dodecane thiol, ethane thiol, octane thiol, and toluene thiol; halogenated hydrocarbons, such as carbon tetrachloride, carbon tetrabromide, and chloroform; amines, such as diethylamine, enol-ethers, among others, including combination thereof. In some implementations, a chain transfer agent is used in an amount of 0.1 to 2% by weight, such as 0.2% to 1% by weight, based on the total weight of the polymer polyol (prior to stripping).

As previously mentioned, one aspect of the processes of this specification is that the PMPO is produced continuously. In some implementations, as is depicted by the Figures, continuous production of the PMPO is carried out using a CSTR as the PMPO reactor. The CSTR can be fitted with impeller(s) and baffles (first-stage) and a plug-flow reactor (second stage). A typical reaction system may be equipped with any combination of jacket/half-coil, internal coil/tubes or external loop/cooler to remove the heat of reaction. Furthermore, the reaction system can utilize a wide range of mixing conditions. The reaction system may be characterized by energy inputs of 0.5 to 350, such as 2 to 50 horsepower per 1000 gallons on average for the bulk phase volume of each reactor. Mixing can be provided by any combination of impeller(s) and pump-around loop/jet mixing. Suitable impellers include axially and/or radially/tangentially acting impellers. In some implementations, a reactor residence time of 20 to 180 minutes may be used. According to implementations of the processes and production plants of this specification reactants are pumped from feed source tanks (which, in the case of the base polyol includes the continuous base polyol reactor) through an in-line static mixer, and then, through a feed tube into the PMPO reactor.

In some implementations, reactant feed stream temperatures to the PMPO reactor are at or near ambient temperature (25° C.), though, if desired, feed streams can be heated to above 25° C. prior to mixing and entering the reactor. Other process conditions, which may be useful, include cooling of the feed tube in the reactor. Furthermore, suitable reaction conditions for preparing the PMPO are, in some cases, characterized by a reaction temperature 80 to 200° ° C. and a pressure of 20 to 80 psig. The continuously produced PMPO can then treated in a single or multi staged stripping step to remove volatiles before entering a stage, which can essentially be any combination of filtration and/or product cooling, prior to proceeding to a PMPO storage tank.

Thus, a suitable continuous process for making PMPO according to this specification comprises (1) providing a heterogeneous mixture of the preformed stabilizer and, optionally, a chain transfer agent, in combination with a base polyol, a free radically polymerizable ethylenically unsaturated monomer, and a free radical polymerization initiator to the continuous PMPO reactor; (2) maintaining the mixture in the PMPO reactor at a temperature sufficient to initiate a free radical reaction, and under sufficient pressure to maintain only liquid phases in the reaction zone, for a period of time sufficient to react at least a major portion of the ethylenically unsaturated monomer to form a heterogeneous mixture containing the polymer polyol, unreacted monomers and chain transfer agent, and stripping the unreacted monomers and diluent from the polymer polyol to recover the unreacted monomers and diluent. This continuous process allows the manufacture of high solids, white polymer polyols with lower viscosities and good stability. Other pertinent details for the continuous process of preparing polymer polyols can be found in, for example, U.S. Pat. No. 5,196,476, the disclosure of which is herein incorporated by reference.

The PMPOs produced by the processes of this specification comprise dispersions in which the polymer particles (the same being either individual particles or agglomerates of individual particles) are relatively small in size and, in the some implementations, have a weight average size less than about ten microns.

Following polymerization, volatile constituents are generally stripped from the PMPO by vacuum distillation, optionally in a thin layer of a falling film evaporator. The monomer-free product may be used as is, or may be filtered to remove any large particles that may have been created.

The PMPO made by the processes and/or with the production plants of this specification are suitable for the preparation of polyurethane foams and elastomers.

The PMPO production processes of this specification, and the production plants described herein that are suitable for implementing such processes, are believed to have several advantages. By utilizing a continuous base polyol produced via a DMC process, the PMPO process can, if desired, be improved via the elimination of storage tanks for the base polyol. A reactor train can combine a continuous DMC polyol process directly with a continuous PMPO process, essentially allowing the base polyol to be produced MTO (made-to-order) and fed directly into the PMPO reactor. This eliminates the need for expensive storage tanks for the base polyol utilized to produce PMPOs. Also, it is believed that the production processes and production plants described in this specification enable production of PMPO's having a relatively high solids content in which the composition and molecular weight distribution of the base polyol can be well-defined and controlled since the base polyol is not prepared in the same reactor as the PMPO. Further, it was observed that, surprisingly, the processes of this specification can produce PMPOs having a viscosity significantly lower than the viscosity of a PMPO made using the same composition but where the base polyol is stored for an extended period of time prior to its use in PMPO production. As will be appreciated, reducing PMPO viscosity can facilitate transport, handling and, ultimately, processability of the PMPO in foam processing equipment in which the PMPO is used. This surprising observation is reflected by the Examples below.

Various aspects of the subject matter described herein are set out in the following numbered clauses:

Clause 1. A process preparing a PMPO comprising: a) continuously producing a base polyol having a functionality of 2 to 8 and a hydroxyl number of 10 to 1000 mg KOH/g in a continuous base polyol reactor; b) continuously discharging the base polyol from the continuous base polyol reactor; c) continuously introducing to a continuous PMPO reactor, which is different from the continuous base polyol reactor, components comprising: (1) the base polyol being continuously discharged from the continuous base polyol reactor; (2) an ethylenically unsaturated monomer, (3) a preformed stabilizer; and (4) a free radical initiator to continuously produce the PMPO; and d) continuously removing the PMPO from the reactor.

Clause 2. The process of clause 1, wherein the base polyol is continuously produced by a process comprising: (1) introducing into the continuous base polyol reactor a mixture comprising a DMC catalyst and an initial starter, wherein the mixture is added in an amount sufficient to initiate polyoxyalkylation of the initial starter after introduction of alkylene oxide into the base polyol reactor; (2) introducing the alkylene oxide to the base polyol reactor; (3) continuously introducing a continuously added starter into the base polyol reactor; and (4) continuously introducing fresh DMC catalyst and/or further DMC catalyst/further starter mixture to the base polyol reactor such that catalytic activity of the DMC catalyst is maintained.

Clause 3. The process of clause 1 or clause 2, wherein the base polyol reactor comprises a single stage CSTR a two stage CSTR, a loop reactor, or a plug flow reactor.

Clause 4. The process of clause 2 or clause 3, wherein the continuously added starter comprises water, ethylene glycol, diethylene glycol, triethylene glycol, propylene glycol, dipropylene glycol, tripropylene glycol, 1,2-, 1,3-, and/or 1,4-butylene glycol, neopentyl glycol, glycerin, trimethylolpropane, triethylolpropane, pentaerythritol, α-methylglucoside, hydroxymethyl-, hydroxyethyl-, and/or hydroxypropylglucoside, sorbitol, mannitol, sucrose, tetrakis [2 hydroxyethyl and/or 2-hydroxypropyl]ethylene diamine, as well as mixtures of any two or more thereof.

Clause 5. The process of one of clause 2 to clause 4, wherein the continuously added starter has a molecular weight of less than 1,000 Da, such as less than 500 Da, or less than 300 Da.

Clause 6. The process of one of clause 2 to clause 5, wherein the alkylene oxide comprises ethylene oxide, propylene oxide, oxetane, 1,2- and 2,3-butylene oxide, isobutylene oxide, epichlorohydrin, cyclohexene oxide, styrene oxide, or a mixture thereof, such as a mixture of propylene oxide and ethylene oxide.

Clause 7. The process of one of clause 1 to clause 6, wherein the PMPO has a solids content of 30 to 75% by weight, 35% to 65% by weight or 40 to 55% by weight, based on the total weight of the PMPO.

Clause 8. The process of one of clause 1 to clause 7, wherein the PMPO has a total ethylene oxide content of up to 25% by weight, such as 1 to 23% by weight, 2 to 20% by weight, 3 to 15% by weight or 5% to 15% by weight.

Clause 9. The process of clause 8, wherein the base polyol continuously introduced to the PMPO reactor has an ethylene oxide content of up to 40% by weight, 1 to 35% by weight, 2 to 25%, 5 to 20% by weight, or, 8 to 20% by weight.

Clause 10. The process of one of clause 1 to clause 9, wherein the PMPO has a viscosity at 25° ° C. of no more than 15,000 mPas, no more than 13,000 mPas, no more than 11,000 mPas, or no more than 8,000 mPas.

Clause 11. The process of one of clause 1 to clause 10, wherein the base polyol continuously introduced to the PMPO reactor comprises a polyether polyol having a functionality 3 to 6 and/or an OH number of 20 to 400 mg KOH/g polyol or 30 to 200 mg KOH/g polyol and/or an oxide content of no more than 100 ppm.

Clause 12. The process of one of clause 1 to clause 11, wherein the base polyol continuously introduced to the PMPO reactor has a molecular weight of 700 to 14,000 g/mol, 1000 to 12,000 g/mol, or 2000 to 10,000 g/mol.

Clause 13. The process of one of clause 1 to clause 12, wherein the unsaturated monomer comprises styrene (and/or its derivatives), acrylonitrile, methyl acrylate, methyl methacrylate, vinylidene chloride, or a mixture thereof, such as a mixture of styrene and acrylonitrile, such as a mixture of styrene and acrylonitrile in which the weight ratio of styrene to acrylonitrile (S:AN) is 80:20 to 20:80, 75:25 to 2:75, or 70:30 to 30:70.

Clause 14. The process of one of clause 1 to clause 13, wherein the preformed stabilizer comprises a reaction product of a reaction mixture comprising: (a) a macromer that contains reactive unsaturation; (b) an ethylenically unsaturated monomer; (c) a free radical initiator; (d) a polymer control agent; and, optionally, (e) a diluent.

Clause 15. The process of clause 14, wherein the macromer comprises a reaction product of a reaction mixture comprising: (i) a starter compound having a functionality of 2 to 8, and a hydroxyl number of 20 to 50; (ii) 0.1 to 3% by weight, based on 100% by weight of the sum of components (i), (ii) and (iii), of a hydroxyl-reactive compound that contains reactive unsaturation; and (iii) from 0 to 30% by weight, based on 100% by weight of the sum of components (i), (ii) and (iii), of a diisocyanate.

Clause 16. The process of one of clause 1 to clause 15, wherein the free-radical initiator used as component (4) in preparing the PMPO comprises a peroxide, a persulfate, a perester, a perborate, a percarbonate, an azo compound, or a combination thereof, such as where the free-radical initiator comprises hydrogen peroxide, di(t-butyl)-peroxide, t-butylperoxy diethyl acetate, t-butyl peroctoate, t-butyl peroxy isobutyrate, t-butyl peroxy 3,5,5-trimethyl hexanoate, t-butyl perbenzoate, t-butyl peroxypivalate, t-amyl peroxypivalate, t-butyl peroxy-2-ethyl hexanoate, lauroyl peroxide, cumene hydroperoxide, t-butyl hydroperoxide, azobis(isobutyronitrile), 2,2'-azo bis-(2-methylbutyronitrile), or a combination thereof.

Clause 17. The process of one of clause 1 to clause 16, further comprising continuously introducing a chain transfer agent to the PMPO reactor, such as where the chain transfer agent comprises a mercaptan, such as dodecane thiol, ethane thiol, octane thiol, toluene thiol or a mixture thereof; a halogenated hydrocarbon, such as carbon tetrachloride, carbon tetrabromide, chloroform, or a mixture thereof; an amine, such as diethylamine, an enol-ether, or a mixture thereof.

Clause 18. The process of one of clause 1 to clause 17, wherein the continuous production of the PMPO is carried out using a CSTR as the PMPO reactor.

Clause 19. The process of one of clause 1 to clause 18, wherein the continuously produced PMPO is treated in a stripping step to remove volatiles prior to storage of the PMPO.

Clause 20. The process of one of clause 1 to clause 19, wherein the continuously producing PMPO comprises: (1) providing a heterogeneous mixture of the preformed stabilizer and, optionally, a chain transfer agent, in combination with a base polyol, a free radically polymerizable ethylenically unsaturated monomer, and a free radical polymerization initiator to the continuous PMPO reactor; and (2) maintaining the mixture in the PMPO reactor at a temperature sufficient to initiate a free radical reaction, and under sufficient pressure to maintain only liquid phases in the reaction zone, for a period of time sufficient to react at least a major portion of the ethylenically unsaturated monomer to form a heterogeneous mixture containing the PMPO, unreacted monomers and chain transfer agent, and (3) stripping the unreacted monomers and diluent from the PMPO to recover the unreacted monomers and diluent.

Clause 21. The process of one of clause 1 to clause 20, wherein the PMPO comprises a dispersion in which the polymer particles have a weight average size less than about ten microns.

Clause 22. A production plant for producing PMPO, comprising: a) a continuous base polyol reactor comprising: (1) an inlet in fluid communication with a source of alkylene oxide; (2) an inlet in fluid communication with a source of starter; (3) an inlet in fluid communication with a source of DMC catalyst; and (4) an outlet configured to continuously discharge a base polyol having a functionality of 2 to 8 and a hydroxyl number of 10 to 1000 mg KOH/g from the base polyol reactor; b) a continuous PMPO reactor comprising: (1) an inlet in fluid communication with the outlet of the base polyol reactor and configured to continuously receive the base polyol from the base polyol reactor as the base polyol is continuously discharged from the base polyol reactor; (2) an inlet in fluid communication with a source of ethylenically unsaturated monomer, (3) an inlet in fluid communication with a source of preformed stabilizer; (4) an inlet in fluid communication with a source of free radical initiator; and (5) an outlet configured to continuously discharge PMPO from the PMPO reactor.

Clause 23. The production plant of clause 22, wherein the continuous base polyol reactor comprises a single stage CSTR, a two stage CSTR, a loop reactor, or a plug flow reactor.

Clause 24. The production plant of clause 22 or clause 23, further comprising a base polyol storage vessel in fluid communication with the outlet of the base polyol reactor and in fluid communication with an inlet of the PMPO reactor.

Clause 25. The production plant of one of clause 22 to clause 24, wherein the inlet of PMPO reactor is configured to continuously receive base polyol only from the base polyol reactor alone, to continuously receive base polyol only from the base polyol storage vessel, and to continuously receive base polyol from both the base polyol reactor and the base polyol storage vessel simultaneously.

Clause 26. The production plant of one of clause 22 to clause 25, wherein the PMPO reactor comprises an inlet in fluid communication with a source of chain transfer agent.

Clause 27. The production plant of one of clause 22 to clause 26 wherein the ethylenically unsaturated monomer comprises a mixture of styrene and acrylonitrile in which the weight ratio of styrene to acrylonitrile (S:AN) is 80:20 to 20:80, 75:25 to 2:75, or 70:30 to 30:70.

Clause 28. The production plant of one of clause 22 to clause 27, wherein the preformed stabilizer comprises a reaction product of a reaction mixture comprising: (a) a macromer that contains reactive unsaturation; (b) an ethylenically unsaturated monomer; (c) a free radical initiator; (d) a polymer control agent; and, optionally, (e) a diluent.

Clause 29. The production plant of one of clause 22 to clause 28, wherein the outlet of the PMPO reactor is in fluid communication with a PMPO stripping system, such as a falling film evaporator.

The non-limiting and non-exhaustive examples that follow are intended to further describe various non-limiting and non-exhaustive implementations without restricting the scope of the implementations described in this specification.

EXAMPLES

The following materials were used in the examples:
Polyol A: a propylene oxide adduct of sorbitol produced by reacting propylene oxide and ethylene oxide in the presence of a potassium catalyst and refining to remove the catalyst, containing a 12% ethylene oxide cap, and having a hydroxyl number of 33 mg KOH/g.
PCA: isopropanol, a polymer control agent
TMI: isopropenyl dimethyl benzyl isocyanate (an unsaturated aliphatic isocyanate) sold as TMI® by Allnex
Initiator 1: tert-butyl peroxy-2-ethylhexanoate, a free-radical polymerization initiator, commercially available from United Initiators under the tradename TBPEH
Initiator 2: tert-amyl peroxy pivalate, a free-radical polymerization initiator commercially available from Nouryon under the tradename Trigonox 125-C75
Initiator 3: 1,1-Di(tert-Amylperoxy)cyclohexane, a free-radical polymerization initiator, commercially available from Nouryon under the tradename Trigonox 122-C80

The test methods used were:
Viscosity: Viscosities were measured in millipascal-seconds (mPa·s) at 25° C. on an Anton Paar SVM3000 viscometer.
Filtration: Filterability was determined by diluting one part by weight sample (e.g. 200 grams) of polymer polyol with two parts by weight anhydrous isopropanol (e.g. 400 grams) to remove any viscosity-imposed limitations and using a fixed quantity of material in relative to a fixed cross-sectional area of screen (e.g. 1⅛ in. diameter), such that all of the polymer polyol and isopropanol solutions passes by gravity through a 700-mesh screen. The 700-mesh screen is made with a Dutch twill weave. The actual screen used had a nominal opening of 30 microns. The amount of sample which passes through the screen within 600 seconds is reported in percent, a value of 100 percent indicates that over 99 weight percent passes through the screen.

Polyether Polyol Preparation:
Polyol B: A 3000 MW PO/EO, glycerin/propylene glycol based polyether was prepared using a continuous polyether process in the following manner: A 3000 MW (56 OH #) PO/EO (93/7), glycerin/propylene glycol (88/12) based polyether containing 20 ppm of DMC catalyst was charged to a 1 gallon stainless steel reactor equipped with a mechanical agitator and slowly heated. During the heat-up continuous vacuum was pulled on the headspace and nitrogen was introduced to the liquid phase via a dip tube. Once the reactor temperature reached 140° C., the vacuum and nitrogen continued for an additional ten minutes, the nitrogen was then stopped and the reactor was blocked in at a pressure of 1.5 psia. An initial charge of propylene oxide (PO) and ethylene oxide (EO) was charged to the reactor over several minutes to activate the catalyst. After 10 minutes the pressure in the reactor decreased indicating that the DMC catalyst was active. The PO and EO were simultaneously restarted and set at a rate of 53.0 g/min for PO and 4.4 g/min for EO (equivalent to a 1 hour residence time). After establishing the oxide feed, a feed containing glycerin (88 weight % based on the combined weight of glycerin and propylene glycol) and propylene glycol (12 weight % based on the combined weight of glycerin and propylene glycol) with 617 ppm of DMC catalyst and 60 ppm of phosphoric acid based off the glycerin weight was started at a rate of 1.92 g/min. The DMC catalyst was added to the glycerin/PG as a dry powder and remained dispersed in the glycerin/PG by constant agitation of the glycerin/PG/DMC catalyst feed vessel. The glycerin/PG/catalyst feed line can also have constant recirculation between the reactor feed point and the glycerin/PG/catalyst feed vessel to eliminate settling of the catalyst in the feed line. The DMC concentration in the glycerin/PG is sufficient to provide 20 ppm in the final product. When the pressure in the reactor reached 45 psia, a valve at the top of the reactor was opened to a back pressure regulator and the contents of the liquid full reactor were allowed to flow out of the reactor. The polyether passed through a steam heated section of pipe to finish the reaction. During the initial line-out the product was collected in a heated and stirred jacketed vessel. After approximately 8 hours of line-out, collection of the final product was started in an insulated vessel that acted as a feed vessel for the continuous PMPO reaction. Antioxidant was added to the insulated feed vessel. The reaction continued for another 5.6 hours at which point the product was re-directed to a final collection vessel (becoming Polyol C). Approximately 20 kg of Polyol B product was collected for the continuous PMPO reaction in the insulated feed vessel. A sample was pulled from the insulated feed vessel for analysis. The Polyol B product had a hydroxyl number of 55.7 mg KOH/g and a viscosity of 606 cSt at 25° C.

Polyol C: comparative example in which Polyol B was directed to a final collection vessel, and stored in final collection vessel 13 days prior to being used on the PMPO reactor. While not explicitly measured, the hydroxyl number and viscosity of Polyol C is expected to be very similar to Polyol B, since both Polyol B and Polyol C came from the same reactor product stream.

Macromer A—Preparation: Macromer A was prepared by heating 100 parts of Polyol A, 2 parts of TMI, and 100 ppm of bismuth(III)neodecanoate catalyst at 75° ° C. for 4 hours.

Preformed Stabilizer (PFS A) Preparation:

The pre-formed stabilizer (PFS A) was prepared in a two-stage reaction system comprising a 0.5 L continuously-stirred tank reactor (CSTR) fitted with an impeller and 4 baffles (first-stage) and a plug-flow reactor (second stage). The residence time in each reactor was about 60 minutes. The reactants were pumped continuously to the reactor from feed tanks through an in-line static mixer and then through a feed tube into the reactor, which was well mixed. The temperature of the reaction mixture was controlled at 120±5° C. The product from the second-stage reactor overflowed continuously through a pressure regulator designed to control the pressure in each stage at 65 psig. The product, i.e. the pre-formed stabilizer, then passed through a cooler and into a collection vessel. The preformed stabilizer formulation is disclosed in Table 1.

TABLE 1

Preformed Stabilizer Composition

| Component | PFS A |
|---|---|
| PCA type | Isopropanol |
| PCA, wt. % | 60.0% |
| Macromer | Macromer A |
| Macromer, wt. % | 24.0% |
| Monomer, wt. % | 15.9% |
| Styrene/acrylonitrile ratio | 50:50 |
| Initiator 1, wt. % | 0.1% |

Polymer Polyol Preparation:

This series of examples (Table 2) relates to the preparation of polymer polyols. The polymer polyols were prepared in a two-stage reaction system comprising a 0.5 L continuously-stirred tank reactor (CSTR) fitted with an impeller and 4 baffles (first-stage) and a plug-flow reactor (second stage). The residence time in each reactor was about 60 minutes. The reactants were pumped continuously to the reactor from feed tanks through an in-line static mixer and then through a feed tube into the reactor, which was well mixed. The temperature of the reaction mixture was controlled at 115±5° C. The product from the second-stage reactor overflowed continuously through a pressure regulator designed to control the pressure in each stage at 45 psig. The product, i.e. the polymer polyol, then passed through a cooler and into a collection vessel. The crude product was vacuum stripped to remove volatiles. The wt. % total polymer in the product was calculated from the concentrations of residual monomers measured in the crude polymer polyol before stripping. The inventive Example 1 utilized the Polyol B in the insulated feed vessel directly from the continuous polyether reactor. Comparative Example 2 utilized Polyol C which had been stored in a final collection vessel for 13 days.

TABLE 2

Formulations for Polymer Polyols

| | Example 1[1] | Example 2[2] |
|---|---|---|
| Polyol B (wt. % in feed) | 46.12 | |
| Polyol C (wt. % in feed) | | 46.12 |
| PFS A (wt. % in feed) | 6.88 | 6.88 |
| Styrene (wt. % in feed) | 30.22 | 30.22 |
| Acrylonitrile (wt. % in feed) | 16.15 | 16.15 |
| Initiator 2 (wt. % in feed) | 0.25 | 0.25 |
| Initiator 3 (wt. % in feed) | 0.015 | 0.015 |
| PCA (wt. % in feed) | 4.50 | 4.50 |
| Total Polymer (wt. %) | 49.25 | 49.34 |
| Viscosity, mPa · s | 5496 | 6459 |
| Filterability - 700 mesh (s) | 184 | 187 |

[1]Inventive example according to FIG. 1Comparative example

As is apparent, the PMPO of Example 1 had a viscosity that is significantly lower than the PMPO of Example 2.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A production plant for producing PMPO, comprising:
 a) a continuous base polyol reactor comprising:
  (1) an inlet in fluid communication with a source of alkylene oxide;
  (2) an inlet in fluid communication with a source of starter;
  (3) an inlet in fluid communication with a source of DMC catalyst; and
  (4) an outlet configured to continuously discharge a base polyol having a functionality of 2 to 8 and a hydroxyl number of 10 to 1000 mg KOH/g from the base polyol reactor;
 b) a continuous PMPO reactor comprising:
  (1) an inlet in fluid communication with the outlet of the base polyol reactor and configured to continuously receive the base polyol from the base polyol reactor as the base polyol is continuously discharged from the base polyol reactor;
  (2) an inlet in fluid communication with a source of ethylenically unsaturated monomer, (3) an inlet in fluid communication with a source of preformed stabilizer;

(4) an inlet in fluid communication with a source of free radical initiator; and (5) an outlet configured to continuously discharge PMPO from the PMPO reactor.

2. The production plant of claim 1, wherein the continuous base polyol reactor comprises a single stage CSTR, a two stage CSTR, or a loop reactor.

3. The production plant of claim 1, further comprising a base polyol storage vessel in fluid communication with the outlet of the base polyol reactor and in fluid communication with an inlet of the PMPO reactor.

4. The production plant of claim 3, wherein the inlet of PMPO reactor is configured to continuously receive base polyol only from the base polyol reactor, to continuously receive base polyol only from the base polyol storage vessel, and to continuously receive base polyol from both the base polyol reactor and the base polyol storage vessel simultaneously.

5. The production plant of claim 1, wherein the PMPO reactor comprises an inlet in fluid communication with a source of chain transfer agent.

6. The production plant of claim 1, wherein the ethylenically unsaturated monomer comprises a combination of styrene and acrylonitrile in which the weight ratio of styrene to acrylonitrile (S:AN) is 80:20 to 20:80.

7. The production plant of claim 1, wherein the preformed stabilizer comprises a reaction product of a reaction mixture comprising:

(a) a macromer that contains reactive unsaturation;

(b) an ethylenically unsaturated monomer;

(c) a free radical initiator;

(d) a polymer control agent; and, optionally, (e) a diluent.

* * * * *